United States Patent [19]

Gooding et al.

[11] Patent Number: 4,580,265

[45] Date of Patent: Apr. 1, 1986

[54] FAILURE DETECTION METHOD AND APPARATUS

[75] Inventors: David N. Gooding; Stefan P. Jackowski, both of Endicott; James T. Moyer; James W. Plant, III, both of Endwell, all of N.Y.

[73] Assignee: International Business Machines Corporation, Armonk, N.Y.

[21] Appl. No.: 509,699

[22] Filed: Jun. 30, 1983

[51] Int. Cl.[4] .............................................. G06F 11/10
[52] U.S. Cl. .......................................... 371/49; 371/60
[58] Field of Search ........................ 371/49, 50, 51, 60, 371/57

[56] References Cited

U.S. PATENT DOCUMENTS

| | | | |
|---|---|---|---|
| 3,456,239 | 7/1969 | Glasson | 371/47 X |
| 3,784,976 | 1/1974 | Ho | 371/49 |
| 3,889,236 | 6/1975 | Herger et al. | 371/49 X |
| 3,992,696 | 11/1976 | Fergeson | 371/51 |
| 4,271,521 | 6/1981 | Mahmoud | 371/51 |
| 4,346,474 | 8/1982 | Sze | 371/49 |

Primary Examiner—Charles E. Atkinson
Attorney, Agent, or Firm—John H. Bouchard

[57] ABSTRACT

A failure detection apparatus detects the existence of an abnormal circuit condition in a circuit which causes a subsequently transmitted data byte to be transmitted from one integrated circuit to another integrated circuit out of sequence relative to a previously transmitted data byte. Even and odd data bytes are received by the first integrated circuit with odd parity. However, the even data byte is transmitted from the first integrated circuit to the second integrated circuit, along existing interface lines extending between the integrated circuits, with odd parity. The parity bit of the odd data byte is inverted, the odd data byte being transmitted along the existing interface lines with even parity. An exclusive OR gate in the second integrated circuit receives the parity bit of the even data byte and passes the parity bit without inversion in response to a first state of a clock signal from an odd latch; however, the exclusive OR gate, upon receipt of the odd data byte, re-inverts the parity bit of the odd data byte in response to a second state of the clock signal. A parity checker compares the data bits of the incoming even and odd data bytes with the parity bit generated by the exclusive OR gate and generates an error check signal representative of the receipt of the subsequently transmitted data byte transmitted out of sequence relative to the previously transmitted data byte when the combined parity of the data bits and parity bit at the input of the parity checker is not odd.

5 Claims, 1 Drawing Figure

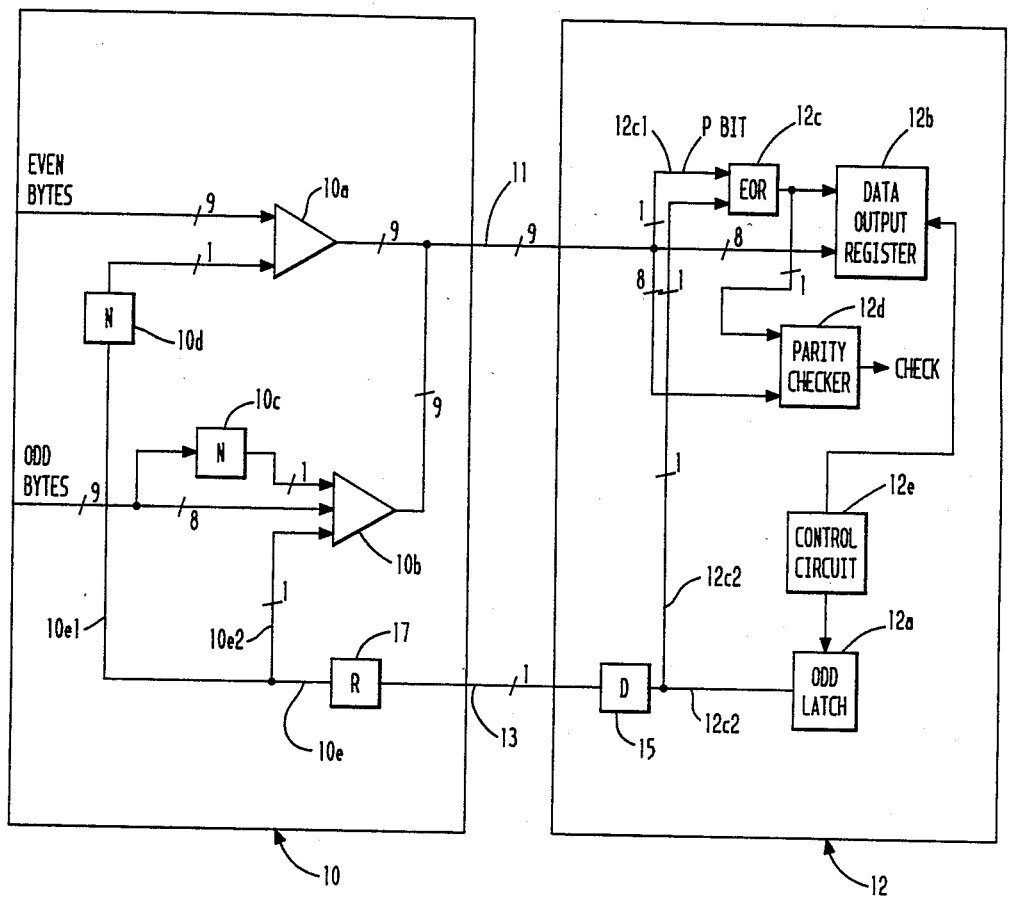

FAILURE DETECTION METHOD AND APPARATUS

BACKGROUND OF THE INVENTION

1. Field of the Invention

The subject matter of the present invention pertains to a computer system, and, more particularly, to a failure detection apparatus in said computer system for detecting the existence of a failure in a gating line thereby detecting the resultant transmission of erroneous data from one circuit module to another via a plurality of interface lines.

2. Description of the Prior Art

Adjacent integrated circuit modules are connected together by a multitude of interface lines. Data is transmitted from one circuit module to another via said interface lines. The data is subdivided into a plurality of bytes. Each byte of the data is transmitted from the one circuit module by a gating circuit, the gating circuit transmitting the data byte in response to a gating pulse. The gating circuit is connected to a latch circuit via a gate line. If the gate line is open or short circuited, or if some other abnormal circuit condition affects said gate line, the bytes of data will not be transmitted from the one circuit module to the other via the gating circuit accurately. As a result, another, adjacent circuit module will receive erroneous data for further processing of said data. Therefore, a failure detection apparatus is needed for detecting the existence of a failure, or other abnormal circuit condition, in the gate line in order to detect the existence of erroneous data and to prevent the transmission of further erroneous data.

In the prior art, in order to detect the presence of defective interface lines, including the gate line, redundant, duplex interface lines were provided for each interface line. If the interface line and its corresponding redundant duplex line were operational, an error signal was not generated. However, when the interface line failed, if the redundant duplex line was operational, an error signal was generated indicative of the presence of the defective interface line. However, the subsequent technological advance of integrated circuit technology reduced the size of integrated circuit chips and therefore reduced the number of input/output (I/0) pins on said chips. The interface lines are connected to said chips via said pins. Since the number of I/0 pins were reduced, the number of available interface lines were also reduced. As a result of the reduction in the number of interface lines, it was no longer feasible to utilize redundant, duplex lines to ensure the detection of defective interface lines. Another, alternative method of detecting the existence of a failing interface line, or a failing gate line was needed.

One alternative method utilized by the prior art is the so-called parity checking scheme. Each of the data bytes of said data include a parity bit. A convention is utilized wherein the parity bit of each data byte is selected in order to maintain, for example, an odd number of binary 1 bits in each transmitted byte of data. If a data byte was transmitted with an even number of binary 1 bits, the byte of data was transmitted erroneously.

However, this method cannot detect the existence of the failing gate line. Data should be transmitted such that odd and even data bytes are transmitted alternately, that is, in an "odd-even-odd . . ." sequence. If a gate line fails, the odd and even data bytes may be transmitted in an erroneous sequence, that is, in an "even-even" or in an "odd-odd" sequence. The above-mentioned method cannot check for data transmitted in an erroneous sequence.

One prior art publication, namely, IBM technical disclosure bulletin Vol. 18, No. 7, December 1975, page 2043, discloses a different type of parity checking scheme. In this scheme, alternate good and bad parity is forced through a parity checking circuit for the purpose of validating the operation of said circuit. This scheme is not set forth in an environment similar to the environment of the present invention, wherein a plurality of interface lines interconnect a plurality of miniature integrated circuits. In addition, this scheme fails to recognize the problems encountered in this environment, namely, the numerous failures which exist with respect to the interface lines and the gate lines which interconnect the miniature integrated circuits and the resultant transmission of erroneous data therebetween, especially with regard to the limited number of I/0 pins on said integrated circuits, the limited number of interface lines extending between adjacent ones of said integrated circuits, and the resultant difficulty of detecting said failures and the resultant transmission of erroneous data without utilizing additional redundant, duplex interface lines to ensure the accuracy of transmitted data.

SUMMARY OF THE INVENTION

It is a primary object of the present invention to detect the existence of failures in a circuit which would cause the transmission of erroneous data from one integrated circuit to another, the detection being performed utilizing the existing interface lines which interconnect the circuits for the transmission of data therebetween.

It is another object of the present invention to detect the existence of failures in a circuit which would cause the transmission of erroneous data from one integrated circuit to another, the detection being performed by utilizing a parity checking scheme in association with the existing interface lines which interconnect the circuits, the parity checking scheme enabling the detection of an erroneous sequence of data transmission from the one integrated circuit to the other.

These and other objects of the present invention are achieved by transmitting even data bytes from the one integrated circuit to the other with an odd parity and by transmitting odd data bytes from the one integrated circuit to the other odd and even parity, respectively, a circuit has failed causing data to be transmitted out-of-sequence. The existing interface lines, which interconnect adjacent integrated circuits, are being utilized in association with this parity checking scheme. The utilization of additional duplex lines, or substantially additional hardware, is not required.

Further scope of applicability of the present invention will become apparent from the detailed description given hereinafter. However, it should be understood that the detailed description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from a reading of the detailed description given hereinbelow and the accompanying drawing, which is given by way of illustration only, and thus is not limitative of the present invention, and wherein:

the drawing figure illustrates the failure detection apparatus of the present invention for detecting the parity of the odd and even data bytes received by a receiving circuit and for developing an error signal if the parity of the received odd bytes is not even and if the parity of the received even bytes is not odd.

DESCRIPTION OF THE PREFERRED EMBODIMENT

Referring to FIG. 1, the failure detection apparatus of the present invention is illustrated. In FIG. 1, a first circuit 10 is connected to a second circuit 12. In the preferred embodiment, the first and second circuits are integrated circuits. In the first circuit 10, a first AND gate 10a receives the even bytes of data to be transmitted to the second circuit 12. A second AND gate 10b receives the odd bytes of data to be transmitted. In the preferred embodiment, the even and odd bytes of data each comprise nine (9) binary bits, one (1) bit being a parity bit. All nine bits of the even byte of data energize, in parallel fashion, input terminals of the first AND gate 10a. Both bytes of data are provided from an external source with an odd parity, that is, an odd number of binary 1 bits comprise odd data parity. However, with respect to the odd bytes of data, eight (8) of the bits, known as data bits, energize input terminals of the second AND gate 10b, in parallel fashion. One bit, the parity bit, is inverted via an inverter 10c before energizing the second AND gate 10b. The odd byte of data is provided from the external source with an odd parity. However, since the parity bit of the odd byte was inverted via inverter 10c before energizing the second AND gate 10b, the odd byte is transmitted with an even parity.

An odd latch circuit 12a, disposed within the second circuit 12, is connected to an additional input terminal of the second AND gate 10b disposed within the first circuit 10 via a driver circuit 15 and a receiver circuit 17. The odd latch circuit 12a is also connected to an additional input terminal of the first AND gate 10a via an inverter 10d, the driver circuit 15 and the receiver circuit 17, the inverter 10d being disposed within the first circuit 10. The odd latch 12a generates a series of pulses, a high pulse being associated with the transmission of an odd byte of data from the first circuit 10, a low pulse being associated with the transmission of an even byte of data from the first circuit 10. The output terminals of the first and second AND gates 10a and 10b are connected together at a junction. The signal appearing on the output junction of AND gates 10a and 10b is a nine bit binary number, and is transmitted to the second circuit in parallel fashion. The nine bit binary number comprises eight data bits and a parity bit. The eight data bits associated with the nine bit binary number energize a data output register 12b and a parity checking circuit 12d.

The parity checking circuit 12d generates an error "check" signal when the total number of binary 1 bits, associated with the signals appearing at both input terminals, is even. As long as the total number of said binary 1 bits, associated with the signals energizing both input terminals of the parity checking circuit 12d, is odd, the error signal will not be generated.

The single parity bit associated with the nine bit binary number energizes one input terminal of an exclusive OR gate 12c via line 12c1. The single bit binary signal generated by the odd latch 12a energizes the exclusive OR gate 12c via line 12c2. The binary signal appearing at the output terminal of the exclusive OR gate 12c is transmitted to the data output register 12b and to the parity checking circuit 12d.

The following is a truth table associated with the exclusive OR gate 12c. The binary signal "1" represents a high signal whereas a binary signal "0" represents a low signal:

| input 12c1 | input 12c2 | output |
| --- | --- | --- |
| 0 | 0 | 0 |
| 1 | 0 | 1 |
| 0 | 1 | 1 |
| 1 | 1 | 0 |

A control circuit 12e is connected to the data output register 12b and to the odd latch 12a for controlling the operation of the register 12b and the latch 12a in synchronism with the transmission of odd and even bytes of data from the first circuit 10 to the second circuit 12.

The functional operation of the Failure Detection Apparatus of the present invention will be described in the paragraphs below with reference to the drawing figure.

When an odd byte of data, comprising eight (8 data bits and one (1) parity bit, is ready for transmission from the first circuit 10 to the second circuit 12, one terminal of AND gate 10b is energized, in parallel fashion, by the eight data bits. The parity bit energizes inverter 10c, and is inverted by said inverter to an opposite state. The odd data bytes are provided from the external source with an odd parity. The odd latch 12a generates a high pulse which energizes the additional input terminal of the second AND gate 10b. As a result, the odd data byte is transmitted from the second AND gate 10b of the first circuit 10. However, since the parity bit is inverted by inverter 10c, the odd data byte is transmitted from the second AND gate 10b of the first circuit 10 with an even parity, the odd data byte comprising nine bits transmitted in parallel fashion.

When the nine-bit odd data byte is received by the second circuit 12, the eight data bits are stored in the data output register 12b. The single parity bit energizes one input terminal of exclusive OR gate 12c via line 12c1. The high pulse, generated from the odd latch 12a, energizes the other input terminal of the exclusive OR gate 12c via line 12c2. In accordance with the truth table for the exclusive OR gate 12c provided above, the parity bit, energizing the one input terminal of the exclusive OR gate 12c via line 12c1, is re-inverted to its original state. The re-inverted parity bit is stored in the data output register, along with the eight data bits, for further processing.

The eight data bits of the odd data byte, transmitted from the second AND gate 10b, is received by one input terminal of the parity checking circuit 12d. The re-inverted parity bit, generated by the output terminal of the exclusive OR gate 12c, is received by the other input terminal of the parity checking circuit 12d. Since the original odd data byte was transmitted from the first circuit 10 with an even parity, and since the exclusive OR gate 12c re-inverted the parity bit of the transmitted odd data byte, the parity of the nine bit odd data byte energizing the parity checking circuit 12d is odd, that is, the total number of bits energizing both input terminals of the parity checker 12d is odd. Therefore, an error "check" signal will not be generated from the parity checking circuit 12d.

As mentioned above, one object of the present invention is to detect the existence of an abnormal circuit condition in a circuit which would cause the erroneous transmission of data from one circuit to another. The odd latch 12a is connected to the AND gates 10a and 10b via lines 10e1 and 10e2, 10e, interface line 13, and line 12c2. If an abnormal circuit condition, such as a short circuit or an open circuit, affects the operation of gate lines 13, 10e, 10e1, or 10e2, erroneous data would be transmitted from the first circuit 10 to the second circuit 12, that is, the odd and even bytes of the data may be transmitted out-of-sequence. For example, assume that line 10e is open circuited (line 12c2 remains operational). The odd latch 12a is transmitting a low signal, yet, because of the open circuit in line 10e, a high signal is energizing the inverter 10d and the AND gate 10b. Therefore, a low signal out of inverter 10d will disable the gate terminal of the first AND gate 10a. As a result, AND gate 10a is disabled, and the even bytes of data cannot be transmitted from the first circuit 10. As a result, two odd bytes of data will be transmitted from AND gate 10b, in sequence, that is, in an "odd-odd . . ." order. When the second sequential odd byte (with the even parity) is transmitted from the second AND gate 10b, the odd latch 12a is transmitting a low pulse, which corresponds to an even byte of data. As a result of the low pulse transmitted from the odd latch 12a, the exclusive OR gate 12c will not change the parity of the second sequential odd byte from even to odd. Therefore, the eight data bits energizing the one input terminal of the parity checking circuit 12d and the single bit from the exclusive OR gate 12c energizing the other input terminal will have an even parity. As a result, an error "check" signal is generated from the parity checking circuit 12d indicative of the abnormal circuit condition on line 10e.

If an even data byte is properly gated through AND gate 10a, in response to a low pulse from the odd latch 12a, a nine-bit even data byte is transmitted, in parallel fashion, from the AND gate 10a. The even data bytes are provided from the external source with odd parity. The eight data bits of the nine-bit byte are stored in the data output register 12b. The parity bit associated with the nine-bit byte energizes one input terminal of the exclusive OR gate 12c, via line 12c. The low pulse from the odd latch 12a energizes the other input terminal of the exclusive OR gate 12c. In accordance with the truth table of the exclusive OR gate 12c, if a low pulse energizes the other input terminal of the gate 12c, the parity bit of the nine-bit byte is not inverted or otherwise changed. Consequently, the even data bytes maintain their odd parity.

The eight data bits, associated with the nine-bit even data byte, energize one set of input terminals of the checking circuit 12d. The original non-inverted parity bit of the nine bit byte, generated by the exclusive OR gate 12c, energizes the other input terminal of the checking circuit 12d. Since the original nine bit even data byte possessed an odd parity, an odd number of binary 1 bits energize the input terminals of the checking circuit 12d. Therefore, an error "check" signal is not generated by the parity checking circuit 12d.

However, assume that the eight data bits of a subsequent nine-bit even data byte, with the odd parity, energize the one set of input terminals of the checking circuit 12d, as a result of an abnormal circuit condition existing in gate line 13, or its branch lines 10e1 or 10e2. A high pulse, indicative of an odd data byte, is generated by the odd latch 12a. The high pulse will change the parity bit of the subsequent nine bit even data byte, via the exclusive OR gate 12c. As a result, the subsequent even data byte will possess an even parity in lieu of an odd parity. An even number of binary 1 bits energize the input terminals of the checking circuit 12d. Therefore, an error "check" signal is generated from the parity checking circuit 12d representative of an abnormal circuit condition existing in the gate line 13, or its branch lines 10e1 or 10e2.

When the eight data bits and the parity bit associated with the odd data bytes are stored in the data output register 12b, and when the data bits including the parity bit are processed, the control circuit 12e sets the register 12b for storage of the upcoming even data bytes and instructs the odd latch 12a to begin the generation of the low pulse therefrom to gate the even bytes through the first AND gate 10a. Similarly, when the data bits of the even byte are stored in the register 12b, and the data bits and the parity bit are processed, the control circuit 12e sets the register for storage of the upcoming transmission of the odd bytes and instructs the odd latch 12a to begin the transmission of the high pulse therefrom to gate the odd bytes through the second AND gate 10b.

In an integrated circuit environment, wherein circuits 10 and 12 represent integrated circuits, the availability of interface lines, such as lines 11 and 13, is limited, primarily due to the miniature size of the integrated circuits 10 and 12. As a result, the existing interface lines cannot be duplicated allowing for duplex testing and failure detection purposes. Therefore, the existing interface lines must be used both for the transmission of data and the detection of failures resulting in the transmission of erroneous data. In this environment, a unique parity checking scheme should be utilized which detects the presence of data transmitted out-of-sequence. The present invention represents such a scheme. The present invention is disposed in an environment wherein interface lines extending between integrated circuits are scarce and the need for the detection of the transmission of erroneous data is substantial. The present invention satisfies this need without a corresponding need for additional interface lines for duplexing purposes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for detecting an abnormal circuit condition resulting in the transmission of an erroneous sequence of data from one circuit to another circuit, said data including even data bytes and odd data bytes, the even and odd data bytes each including a plurality of data bits and a parity bit, the even and odd data bytes of said data being provided to said one circuit with a predetermined parity for transmission to said another circuit, comprising:

first circuit means disposed within said another circuit for developing an alternating signal, said alternating signal having a first state associated with said even data bytes and a second state associated with said odd data bytes;

second circuit means disposed within said one circuit, connected to said first circuit means and responsive to said alternating signal for transmitting said even data bytes with said predetermined parity and for inverting the parity bit of said odd data bytes thereby transmitting said odd data bytes with a parity opposite to said predetermined parity;

third circuit means disposed within another circuit, connected to said first circuit means and said second circuit means and responsive to the parity bit of said even data bytes, the parity bit of said odd data bytes, and said alternating signal from said first circuit means for passing the received parity bit without inversion and generating a first output signal indicative of a non-inverted parity bit in response to said first state of said alternating signal and for re-inverting the received parity bit and generating a second output signal indicative of the re-inverted parity bit in response to said second state of said alternating signal; and parity checker means disposed within said another circuit and responsive to said first and second output signal from said third circuit means and to said plurality of data bits associated with said even and odd data bytes for generating an error check signal when the parity associated with said first or second output signal from said third circuit means and the plurality of received data bits corresponds to said parity opposite to said predetermined parity.

2. The apparatus of claim 1, wherein said even data bytes and said odd data bytes are received by said one circuit with odd parity, said even data bytes being transmitted from said second circuit means of said one circuit with odd parity, said second circuit means inverting the parity bit of said odd data bytes and transmitting said odd data bytes from said one circuit with even parity.

3. The apparatus of claim 2, wherein said third circuit means within said another circuit receives the parity bit of said even and odd data bytes and receives the alternating signal from said first circuit means, said third circuit means re-inverting the received parity bit in response to said second state of said alternating signal and generating said second output signal, said third circuit means not re-inverting the received parity bit in response to said first state of said alternating signal and generating said first output signal.

4. The apparatus of claim 3, wherein said parity checker means determines the parity associated with said plurality of received data bits in combination with said first or second output signal from said third circuit means and generates said error check signal when the determined parity is even.

5. A method of detecting the receipt of a second piece of data when said data has been transmitted out-of-sequence relative to a first piece of data, comprising the steps of:

transmitting the first piece of data with a predetermined parity, said first piece of data comprising a plurality of data bits and a parity bit;

inverting a parity bit associated with the second piece of data and transmitting the second piece of data with a parity opposite to said predetermined parity, said second piece of data comprising a plurality of data bits and a parity bit;

generating a clock signal having two states, a first state corresponding to said first piece of data and a second state corresponding to said second piece of data;

comparing the parity bit of said first and second piece of data with the state of said clock signal, re-inverting said parity bit only when said state of said clock signal corresponds to said second state, and generating a further parity bit in response thereto; and determining a new combined parity utilizing said plurality of data bits of said first and second pieces of data and said further parity bit and generating an error check signal representative of the transmission of said second piece of data out-of-sequence relative to said first piece of data when the new combined parity is said parity opposite to said predetermined parity.

* * * * *